United States Patent
Krajcevski (10) Patent No.: US 12,440,985 B2
(45) Date of Patent: Oct. 14, 2025

(54) REPRESENTING COLLISION EXCLUSION RELATIONSHIPS IN ROBOTIC OPERATING ENVIRONMENTS

(71) Applicant: Intrinsic Innovation LLC, Mountain View, CA (US)

(72) Inventor: Pavel Krajcevski, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 404 days.

(21) Appl. No.: 17/963,656

(22) Filed: Oct. 11, 2022

(65) Prior Publication Data

US 2024/0116179 A1  Apr. 11, 2024

(51) Int. Cl.
  *B25J 9/16*  (2006.01)
  *G06F 9/30*  (2018.01)
  *G06F 16/22*  (2019.01)

(52) U.S. Cl.
  CPC ......... B25J 9/1666 (2013.01); B25J 9/1671 (2013.01); *G05B 2219/40317* (2013.01); *G05B 2219/40476* (2013.01); *G06F 9/30018* (2013.01); *G06F 9/30038* (2023.08); *G06F 16/2237* (2019.01)

(58) Field of Classification Search
  CPC ...... B25J 9/1666; B25J 9/1671; B25J 9/1676; G05B 2219/40317; G05B 2219/40476; G05B 2219/40099; G05B 2219/40392; G06F 9/30038; G06F 9/30018; G06F 16/2237

See application file for complete search history.

(56) References Cited

U.S. PATENT DOCUMENTS

| | | | | |
|---|---|---|---|---|
| 2010/0223237 | A1* | 9/2010 | Mishra | G06F 9/30174 707/693 |
| 2021/0060779 | A1* | 3/2021 | Dupuis | B25J 9/0084 |
| 2022/0391433 | A1* | 12/2022 | Maheshwari | G06N 3/0464 |
| 2023/0230484 | A1* | 7/2023 | Al Faruque | G06V 10/82 |
| 2023/0286156 | A1* | 9/2023 | Murray | B25J 9/1666 |
| 2024/0059317 | A1* | 2/2024 | Quirynen | B60W 10/18 |

OTHER PUBLICATIONS

Tsukiyama et al., "A New Algorithm for Generating All the Maximal Independent Sets", SIAM J Comput, 1977 (Year: 1977).*
Chiba et al., "Arboricity and subgraph listing algorithms" Society for Industrial and Applied Mathematics, 1985, 14 pages.

(Continued)

*Primary Examiner* — Thomas E Worden
*Assistant Examiner* — Benjamin J Brosh
(74) *Attorney, Agent, or Firm* — Fish & Richardson P.C.

(57) ABSTRACT

Methods, systems, and apparatus, including computer programs encoded on computer storage media, for converting between different representations of collision exclusion relationships. One of the methods includes identifying a plurality of cliques in a collision exclusion graph. A bitmask representing collision exclusion relationships between the particular object and other objects in the robotic operating environment is generated using the identified cliques. A simulation of executing a robotic control plan for a robot in the robotic operating environment is performed using the generated bitmasks to detect collisions.

18 Claims, 6 Drawing Sheets

(56) References Cited

OTHER PUBLICATIONS

Eppstein et al., "Listing All Maximal Cliques in Sparse Graphs in Near-optimal Time" arXiv, 2010, 13 pages.
Johnson et al., "On generating all maximal independent sets" Elsevier, 1988, 5 pages.
Makino et al., "new algorithms for enumerating all maximal cliques" SWAT, 2004, 13 pages.
Tomita et al., "The worst-case time complexity for generating all maximal cliques and computational experiments" Elsevier, 2006, 15 pages.
Tsukiyama et al., "A new algorithm for generating all the maximal independent sets" SIAM J Comput,. 1977, 1 page.
mathworld.wolfram.com [online], "Wolfram MathWorld," Last updated Jan. 20, 2025, retrieved on Jan. 30, 2025, retrieved from URL <http://www.assaabloy.com/en/com/Press-News/News/2011/NFC-enabled>, 1 pages.
sdformat.org [online], "SDFormat," Jan. 25, 2022, retrieved on Jan. 30, 2025, retrieved from URL <https://en.wikipedia.org/wiki/Greedy_coloring>, 14 pages.
wikipedia.org [online], "Bron-Kerbosch algorithm," Last edited Jan. 1, 2025, retrieved on Jan. 30, 2025, retrieved from URL <https://en.wikipedia.org/wiki/Greedy_coloring>, 5 pages.
wikipedia.org [online], "Greedy coloring," Last edited Dec. 3, 2024, retrieved on Jan. 30, 2025, retrieved from URL <https://en.wikipedia.org/wiki/Greedy_coloring>, 7 pages.

\* cited by examiner

REPRESENTING COLLISION EXCLUSION RELATIONSHIPS IN ROBOTIC OPERATING ENVIRONMENTS

BACKGROUND

This specification relates to robotic control systems. A robotic control system is a software system that controls the actions of physical devices, e.g., actuators or robots. Robotic control systems often have robotic planners that utilize simulators to evaluate candidate control plans or to allow users to observe the effects of a candidate control plan. Different components of such systems might represent collision exclusion relationships in different formats. For example, some planning systems represent collision exclusion relationships using a graph, while some simulators represent collision exclusion relationships using bitmasks. Converting between these formats is in general an NP hard problem computationally. Therefore, as the number of objects to be simulated grows, the computational cost of performing the conversion quickly becomes prohibitively expensive to use for real-world robotics applications.

SUMMARY

This specification describes systems and techniques for performing computationally efficient conversions of different representations of collision exclusion relationships when performing simulations for a robotic operating environment or when generate robotic control plans for one or more robots operating in the environment.

In this specification, a collision exclusion relationship between two or more objects in an environment represents that collisions need not be considered between the two or more objects for a particular computational application, e.g., simulation or robotic planning, to name just two examples. Collision exclusion relationships can be used to improve the performance of computationally expensive processes by omitting the computation required to establish a collision between objects having collision exclusion relationships. For example, the ground and a table resting on the ground are two entities that might be assigned a collision exclusion relationship in a simulation because they are objects that generally do not need to be considered as candidates for a collision in order to effectively simulate the result of a robotic motion plan. Thus, a collision exclusion relationship can identify that the two or more objects do not or cannot collide in the real world in fact, or that even if they may actually collide, for the purposes of the computational process being executed, any potential collisions between them need not be considered and can be ignored. The collision exclusion relationships thus provide a powerful performance improvement that still allows for high-fidelity simulation and robotic planning despite using a simplified representation of the real world. In this specification, when collision exclusion relationships are discussed in the context of objects that cannot collide or that are unable to collide, it does not necessarily mean that the objects cannot share the same physical or virtual region of space. Rather, it simply means that for the computational application that is using the collision exclusion relationships, the fact that the objects may occupy the same region of physical or virtual space can be ignored for the purposes of detecting collisions.

Different systems can represent collision exclusion relationships in different ways, e.g., using different data structures. For example, some systems can maintain data representing a collision exclusion graph representing collision exclusion relationships between objects in a robotic operating environment. As another example, some systems can maintain a set of collision exclusion bitmasks representing the collision exclusion relationships between the objects in the robotic operating environment.

Using techniques described in this specification, a system can convert a first representation of collision exclusion relationships to a second representation of the collision exclusion relationships in order to perform a simulation or generate a robotic control plan using the second representation. For example, the system can be configured to convert a collision exclusion graph to a set of collision exclusion bitmasks, and/or a set of collision exclusion bitmasks to a collision exclusion graph.

The system can then use the converted representation of the collision exclusion relationship to generate one or more robotic control plans for respective robots in the environment. For example, a simulator can use the converted representation to generate a simulation of the environment, where objects that have a collision exclusion relationship, as identified by the converted representation, are determined not to collide in the simulation.

Particular embodiments of the subject matter described in this specification can be implemented so as to realize one or more of the following advantages.

Some systems, e.g., components of a robotic planning system that is configured to generate robotic control plans for causing robots to complete tasks, can require a particular representation of collision exclusion relationships between objects in the environment in which the robots are to operate. Without access to the particular representation of the collision exclusion relationships, the systems can be unable to access the information required to generate high-quality robotic control plans, or may be unable to generate robotic control plans at all. Using techniques described in this specification, a system can generate the required particular representation of the collision exclusion relationships in a time- and computationally-efficient way, allowing the robotic planning system to generate high-quality robotic controls plans that cause the robots to effectively and efficiently complete the required tasks.

Some particular representations of collision exclusion relationships can be more efficient for storage than other representations, e.g., because the particular representations more compactly encode the collision exclusion relationships than other representations (e.g., so that they require less memory to store than the other representations) or because the system storing the particular representations, e.g., a storage system associate with a robotic planning system, is particularly configured to store the particular representations. As a particular example, storing a collision exclusion graph can be highly efficient in a robotic planning system that represents other aspects of the robots or the robotic operating environment using graphs. For instance, if the robotic planning system already stores data representing nodes corresponding to respective objects in a robotic operating environment, then additional edges representing collision exclusion relationships can be added to the stored data more efficiently (e.g., using less memory or computational resources) than storing an entirely new representation of the collision exclusion graphs (e.g., collision exclusion bitmasks). Thus, using techniques described in this specification, a robotic planning system can store a first representation of collision exclusion relationships that is efficient for storage, and then convert the first representation to a second representation that can be used to generate robotic control plans.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
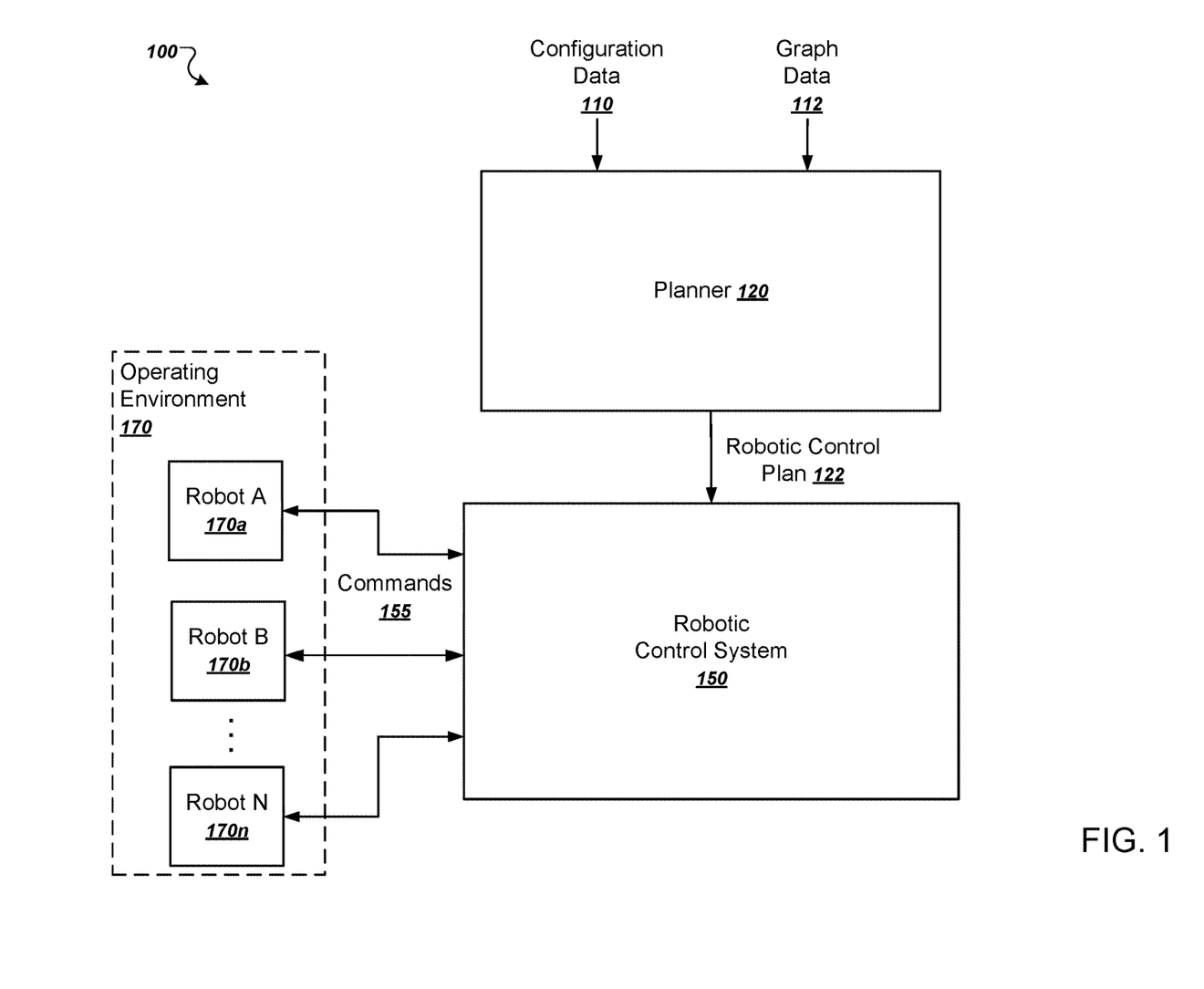
FIG. 1 is a diagram that illustrates an example system.

FIG. 1 is a diagram that illustrates an example system 100. The system 100 is an example of a system that can implement the techniques described in this specification.

The system 100 includes a number of functional components, including a planner 120 and a robotic control system 150. Each of these components can be implemented as computer programs installed on one or more computers in one or more locations that are coupled to each other through any appropriate communications network, e.g., an intranet or the Internet, or combination of networks. The system 100 also includes an operating environment 170 that includes N robots 170a-n.

The robotic control system 150 is configured to control the robots 170a-n in the operating environment 170. For example, the robotic control system 150 can be a real-time robotic control system that is configured to ensure that one or more real-time constraints of the robots 170a-n in the operating environment 170 are satisfied, as described above. The operating environment 170 can alternatively or in addition be a virtual operating environment, e.g., a simulation of a purely digital operating environment or a simulation that mirrors a physical operating environment. When executing the collision exclusion techniques described in this specification in a physical operating environment, other built-in safeguards can ensure that collisions do not actually occur, such as inverse kinematics, sensors, and parallel safety systems. In a virtual environment, objects with collision exclusion relationships that end up occupying a same volume of space can simply be allowed to overlap without triggering the simulation of their interaction or collision.

The overall goal of the planner 120 is to generate a robotic control plan 122 that allows the robotic control system 150 to control the robots 170a-n in the operating environment 170 to execute one or more tasks. The robots 170a-n can be configured to perform any appropriate set of tasks. The robots 170a-n can be configured to fabricate or assemble objects, transport object between respective locations, or perform inspection or testing of objects (e.g., for quality control or safety purposes), to name just a few examples.

To generate the robotic control plan 122, the planner 120 obtains a set of inputs including configuration data 110 and graph data 112.

The configuration data 110 defines the one or more tasks that are to be executed by the robots 170a-n in the operating environment 170. The configuration data 110 can have any appropriate format for defining the one or more tasks to be executed by the robots 170a-n, and can define any parameter of the task execution. In some implementations, the configuration data 110 can leave some or all of the parameters of the task execution undefined, giving the planner 120 more flexibility when generating the robotic control plan 130. In some implementations, the configuration data 110 has been generated or otherwise configured by a user, e.g., by interacting with a graphical user interface or writing a configuration file that identifies desired and/or required attributes of the task execution. In some other implementations, the configuration data 110 has been automatically generated by an external system.

The graph data 112 represents a collision exclusion graph that identifies how objects in the operating environment 170 can collide with each other.

In some implementations, the graph data 112 is stored by the system 100, e.g., for generating multiple different robotic control plans 122 for the same operating environment 170. In some other implementations, the graph data 112 is obtained from an external system.

To generate the robotic control plan 122, the planner 120 is configured to model collision exclusion relationships between respective objects in the operating environment 170, e.g., between pairs of robots 170a-n and/or between the robots 170a-n and other objects in the operating environment 170. In this specification, a collision exclusion relationship between two objects identifies that potential collisions between the two objects can be disregarded, e.g., when performing a simulation or when generating or executing the robotic control plan 122. In particular, the planner 120 can be configured to generate a robotic control plan 122 that defines movement for the robots 170a-n such that executing the robotic control plan 122 will not cause any unplanned collisions among the robots 170a-n and/or between the robots 170a-n and other objects in the operating environment 170.

The graph data 112 represents a collision exclusion graph for the objects in the operating environment 170. In this specification, a collision exclusion graph is a graph that at least partially encodes collision exclusion relationships between a set of objects. That is, the graph data 112 represents a graph that encodes collision exclusion relationships between the robots 170a-n and/or other objects in the operating environment 170.

The collision exclusion graph represented by the graph data 112 includes a set of nodes and a set of edges connecting respective pairs of nodes.

At least some of the nodes of the collision exclusion graph represent respective objects that will be in the operating environment 170 when the robotic control plan 122 is executed.

At least some of the edges of the collision exclusion graph represent respective collision exclusion relationships between the objects in the operating environment 170. In particular, an edge between a first node representing a first object and a second node representing a second object can identify that the first object and the second object have a collision exclusion relationship.

In some implementations, each node in the collision exclusion graph represents a respective object in the operating environment 170. In some other implementations, one or more nodes of the collision exclusion graph do not represent respective objects in the operating environment 170. For example, the collision exclusion graph can be a graph that includes nodes that encode other components or aspects of the operating environment 170, e.g., environmental aspects such as climate control. Equivalently, the collision exclusion graph can be considered to be a component of a graph that includes (i) the collision exclusion graph encoding collision exclusion relationships and (ii) one or more other graphs encoding other information about the operating environment 170.

In some implementations, each edge between a pair of nodes in the collision exclusion graph represents a collision exclusion relationship between a respective pair of objects represented by the pair of nodes. In some other implementations, one or more edges between respective pairs of nodes do not represent collision exclusion relationships between the pairs of objects represented by the respective pairs of nodes. For example, the collision exclusion graph can be a graph that includes edges that encode information other than collision exclusion relationships, e.g., communicative or physical coupling between the objects represented by the pair of nodes, or relationships between the poses of the objects in the operating environment 170. Equivalently, as described above, the collision exclusion graph can be considered to be a component of a graph that includes other graphs (e.g., graphs sharing the same set of nodes but having different edges) that encode other information about the operating environment 170.

Figure 2A:
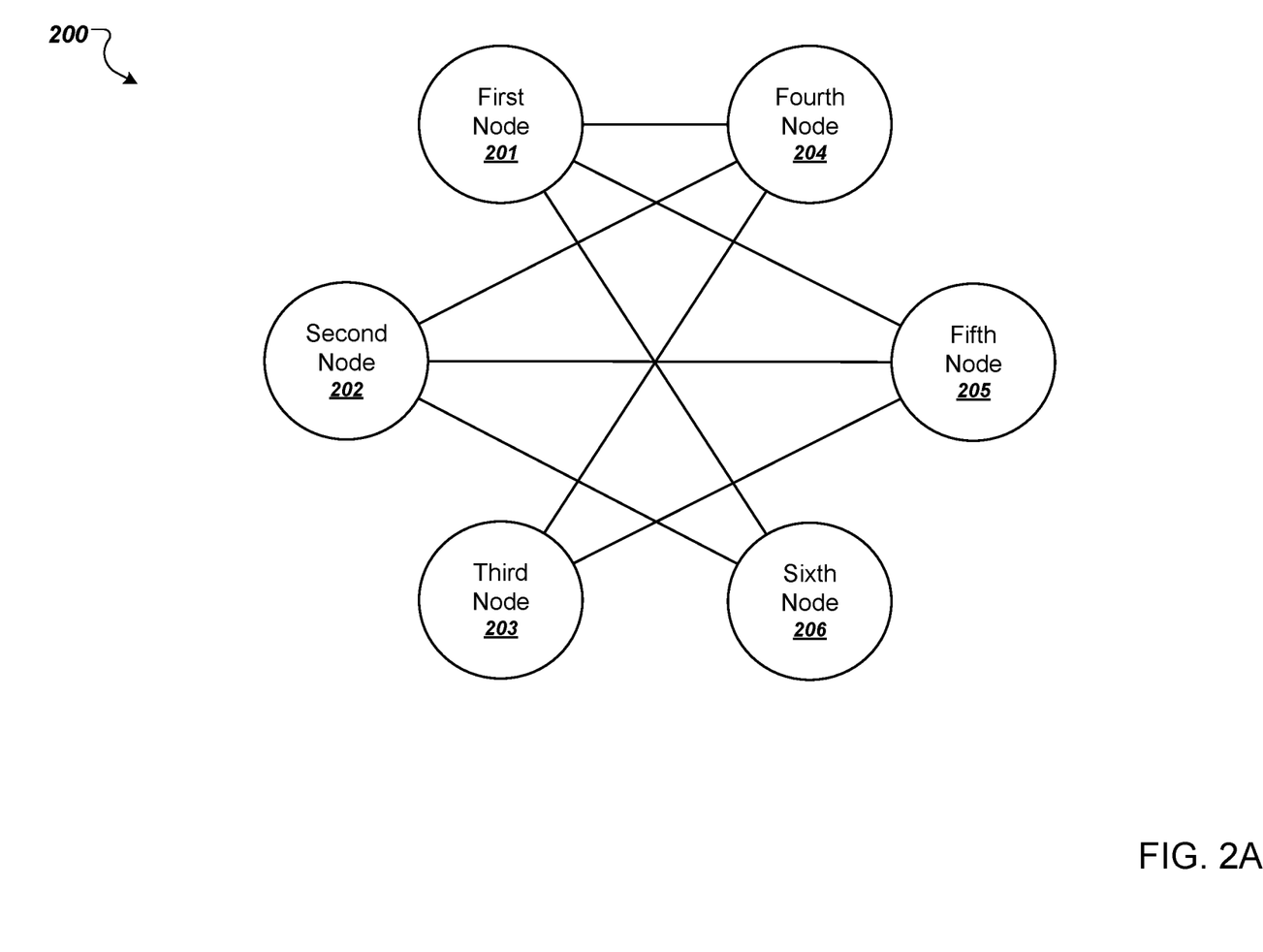
FIG. 2A illustrates an example collision exclusion graph.

FIG. 2A illustrates an example collision exclusion graph 200.

The collision exclusion graph 200 includes a set of six nodes 201-206 that each represent a respective object in a robotic operating environment, e.g., the operating environment 170 described with reference to FIG. 1.

The collision exclusion graph 200 also includes a set of edges, where each edge connects a respective pair of nodes 201-206 and represents a collision exclusion relationship between the objects represented by the respective pair of nodes 201-206.

For example, as depicted in FIG. 2A, because of the collision exclusion relationships, the object represented by the first node 201 cannot collide (or, as described above, is represented in a model or simulation of the robotic operating environment as not able to collide) with the objects represented by the fourth node 204, fifth node 205, and sixth node 206. Similarly, the object represented by the second node 202 cannot collide in the robotic operating environment with the objects represented by the fourth node 204, fifth node 205, and sixth node 206; and the object represented by the third node 203 cannot collide with the objects represented by fourth node 204 and fifth node 205.

Referring back to FIG. 1, the planner 120 can use the graph data 112 representing the collision exclusion graph to generate a robotic control plan 122 that, when executed by the robots 170a-n in the operating environment 170, does not result in any unplanned collisions.

The planner 120 can be configured to convert the collision exclusion graph represented by the graph data 112 into a different representation of the collision exclusion relationships between the objects in the operating environment 170. For instance, the planner 120 can be configured to convert the collision exclusion graph to a set of collision exclusion bitmasks. In this specification, a collision exclusion bitmask is a bitmask that at least partially encodes collision exclusion relationships between a set of objects.

The planner 120 can be required to convert between representations of the collision exclusion relationships for any appropriate reason. For example, different components of the planner 120 can be configured to process respective different representations of the collision exclusion relationships of the objects in the operating environment 170, and so the planner 120 can be required to convert the collision exclusion graph into a new representation on order to provide the new representation to a component that is not configured to process a collision exclusion graph but rather is configured to process the new representation of the collision exclusion relationships. As a particular example, the planner 120 can include a simulator that is configured to simulate motion of objects in the operating environment 170, e.g., motion of the robots 170a-n when executing the robotic control plan 122. The simulator can be configured to consume collision exclusion bitmasks, instead of the collision exclusion graph, to determine whether objects will collide when the robotic control plan 122 is executed.

As another example, as described above, in some implementations the system 100 can more efficiently store a first representation of the collision exclusion relationships than a second representation that is required for generating the robotic control plan 122. As a particular example, as described above, in some implementations the collision exclusion graph represented by the graph data 112 can be a component of a graph that encodes other information about the robotic operating environment 170; in these implementations, it can be more efficient (e.g., requiring fewer computational and/or memory resources) to store data representing the collision exclusion graph and then convert the collision exclusion graph to a set of collision exclusion bitmaps when generating the robotic control plan 122 than it would be to store the collision exclusion bitmaps themselves.

Although the below description generally refers to the planner 120 converting the representations of the collision exclusion relationships, in some other implementations a different system performs the conversion and provides the converted representations to the planner 120. That is, a different system (e.g., that is a component of the system 100 or that is external to the system 100) can process the graph data 112 to generate the collision exclusion bitmasks as described below, and provide the collision exclusion bitmasks to the planner 120 for generating the robotic control plan 122.

From the collision exclusion graph represented by the graph data 112, the planner 120 can generate a respective collision exclusion bitmask for each object in the operating environment 170 represented by a node in the collision exclusion graph. For each pair of objects, the pair of corresponding collision exclusion bitmasks can collectively identify whether the pair of objects have a collision exclusion relationship. That is, whether the pair of objects have a collision exclusion relationship can be determined by comparing or performing operations on the corresponding pair of collision exclusion bitmasks. Generally, the collision exclusion bitmask for the each object has the same number of bits, i.e., a respective value for the bit at each of the same number of bit positions within the bitmasks.

For example, the planner 120 can generate the collision exclusion bitmasks such that, for each pair of objects, the bitwise-AND between the corresponding pair of collision exclusion bitmasks is equal to zero if and only if the pair of objects have a collision exclusion relationship. That is, the pair of objects can be determined not to have a collision exclusion relationship if, for at least one bit position of the collision exclusion bitmasks generated by the planner 120, the value of the bit at the bit position in the collision exclusion bitmasks corresponding to both objects is '1'.

Figure 3:
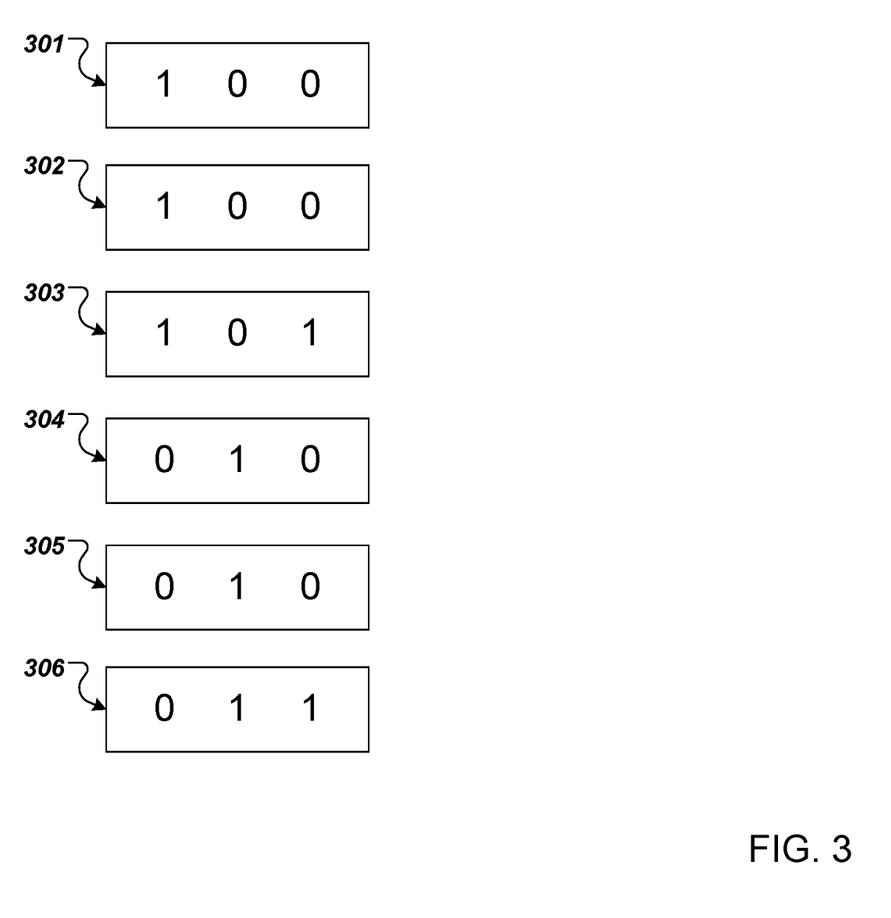
FIG. 3 illustrates example collision exclusion bitmasks.

FIG. 3 illustrates example collision exclusion bitmasks 301-306.

The collision exclusion bitmasks 301-306 each represent a respective object represented by the collision exclusion graph 200 described above with reference to FIG. 2. In particular, the first collision exclusion bitmask 301 represents the same object represented by the first node 201 in the graph 200, the second collision exclusion bitmask 302 represents the same object represented by the second node 202 in the graph 200, the third collision exclusion bitmask 303 represents the same object represented by the third node 203 in the graph 200, the fourth collision exclusion bitmask 304 represents the same object represented by the fourth node 204 in the graph 200, the fifth collision exclusion bitmask 205 represents the same object represented by the fifth node 205 in the graph 200, and the sixth collision exclusion bitmask 306 represents the same object represented by the sixth node 206 in the graph 200.

The collision exclusion bitmasks 301-306 encode the same collision exclusion relationships as the graph 200 described above with reference to FIG. 2A. For example, as depicted in FIG. 3, due to the collision exclusion relationships, the object represented by the first collision exclusion bitmask 301 cannot collide (or, as described above, is represented in a model or simulation of the robotic operating environment as not able to collide) with the object represented by the fourth collision exclusion bitmask 304 because the bitwise-AND between the first collision exclusion bitmask 301 and the fourth collision exclusion bitmask 304 is equal to zero. The object represented by the first collision exclusion bitmask 301 can also not collide with the objects represented by the fifth collision exclusion bitmask 305 and sixth collision exclusion bitmask 306. Similarly, the object represented by the second collision exclusion bitmask 302 cannot collide in the robotic operating environment with the objects represented by the fourth collision exclusion bitmask 304, fifth collision exclusion bitmask 305, and sixth collision exclusion bitmask 306; and the object represented by the third collision exclusion bitmask 303 cannot collide with the objects represented by fourth collision exclusion bitmask 304 and fifth collision exclusion bitmask 305.

Referring back to FIG. 1, the planner 120 can be configured to generate the collision exclusion bitmasks for the objects in the operating environment 170 (e.g., the collision exclusion bitmasks 301-306) from the collision exclusion graph represented by the graph data 112 (e.g., the collision exclusion graph 200) using any appropriate technique.

Intuitively speaking, if a set of objects share a bit in a collision bitmask (the opposite of a collision exclusion bitmask), then all objects with that bit being set will collide. This means that in a graph of collisions between objects, all objects that share a bit in a collision bitmask will form a clique. Thus, preserving all of the collision properties between all objects can involve finding a set of cliques that will cover all of the edges in the "collision graph", which is the complement of the collision exclusion graph.

For example the planner 120 can first generate data representing the complement of the collision exclusion graph represented by the graph data 112. In this specification, the complement of a first graph (also called the inverse of the first graph) is a second graph that includes the same nodes as the first graph, where two nodes share an edge in the second graph if and only if the two nodes do not share an edge in the first graph.

After generating the data representing the complement of the collision exclusion graph, the planner 120 can determine a set of maximal cliques of the complement of the collision exclusion graph. In this specification, a clique of a graph is a set of nodes of the graph where each pair of nodes in the set shares an edge. Put another way, a clique is a complete subgraph of a graph. In this specification, a maximal clique of a graph is a clique of the graph that cannot be augmented by adding an additional node, i.e., a clique that is not a proper subset of a larger clique.

The planner 120 can use any appropriate technique to identify the cliques of the complement of the collision exclusion graph. As one example, the planner 120 can use a graph coloring algorithm to identify the cliques, where each node of the complement of the collision exclusion graph is assigned a respective color from a set of colors. This is because a clique in one graph is an independent vertex set in its complement, and independent vertex sets can be found by coloring the graph. By definition if two vertices share a color, they don't share an edge.

Thus, the system can identify the cliques by generating a coloring in the exclusion graph (the complement of the collision graph), e.g., using a greedy algorithm, and then removing all of the edges from the collision graph that correspond to the cliques defined by this coloring. During this process, each clique corresponds one bit in the bitmask. Once the edges are removed, the system repeats the process on the new graph (now having fewer edges) until either (A) the system runs out of bits (a failure mode), or (B) all edges are covered (success).

The system can also use a some heuristics to improve performance of this process. First, for each coloring, the system can be programmed to only remove the edges from the first two cliques (corresponding to the first two colors), since the greedy algorithm biases towards the first assigned colors, and the smaller cliques usually aren't worth consuming the bits.

Second, the system can precondition the coloring using edges from the collision graph. If an edge remains in the collision graph, then the system can use it to assign the same color to both vertices in the collision exclusion graph. This heuristic increases the number of colors used, usually, but it has the advantage of biasing the greedy algorithm to have the larger cliques that include more edges that weren't covered in the previous iterations. This heuristic is complemented by using the first heuristic, which tends to ensure that the increase in colors is not an issue anyway.

Lastly, the system can be programmed to ignore intra-robot exclusions, because there is often a separate setting for making robots not collide with themselves.

Alternatively or in addition, the system can use any other appropriate algorithm for identifying maximal cliques. To name a few other examples, the planner 120 can perform the Bron-Kerbosch algorithm or a variant thereof; the algorithm presented by Tomita et al. in "The worst-case time complexity for generating all maximal cliques and computational experiments" (doi:10.1016/j.tcs.2006.06.015) or a variant thereof; the algorithm presented by Eppstein et al. in "Listing All Maximal Cliques in Sparse Graphs in Near-optimal Time" (arXiv:1006.5440) or a variant thereof; the algorithm presented by Tsukiyama et al. in "A new algorithm for generating all the maximal independent sets" (doi:10.1137/0206036) or a variant thereof; the algorithm presented by Chiba et al. in "Arboricity and subgraph listing algorithms" (doi:10.1137/0214017) or a variant thereof; the algorithm presented by Makino et al. in "New algorithms for enumerating all maximal cliques" (doi:10.1007/978-3-540-27810-8_23) or a variant thereof; or the algorithm presented by Johnson et al. in "On generating all maximal independent sets" (doi:10.1016/0020-0190(88)90065-8) or a variant thereof.

After generating the cliques, the clique membership of each object determines its collision exclusion bitmask. For each object in the operating environment 170 represented by a node of the collision exclusion graph (and thus represented by a node of the complement of the collision exclusion graph, since the graph and its complement share the same set of nodes), the planner 120 can generate the collision exclusion bitmask for the object according to the corresponding node's membership or non-membership in the respective cliques of the complement of the collision exclusion graph.

In particular, each bit position in the generated bitmasks can correspond to a respective different clique of the complement of the collision exclusion graph. For each clique, the planner 120 can determine whether the node representing the object in the complement of the collision exclusion graph is a member of the clique. If the node is a member of the clique, then the planner 120 can determine the value of the bit corresponding to the clique to be '1' in the bitmask for the object. If the node is not a member of the clique, then the planner 120 can determine the value of the bit corresponding to the clique to be '0' in the bitmask for the object.

Intuitively, since the collision exclusion graph identifies pairs of objects that cannot collide, the complement of the collision exclusion graph identifies pairs of objects that can collide, where a pair of nodes shares an edge if the corresponding objects do collide in the operating environment 170. Thus, if a set of nodes are in the same clique in the complement of the collision exclusion graph (i.e., are all connected by edges and thus can all collide with each other), then the bitmasks of those nodes should have a value of '1' in the same bit position (i.e., the bit position corresponding to the clique) so that their bitwise-AND will not equal zero, thus indicating that they can collide.

Figure 2B:
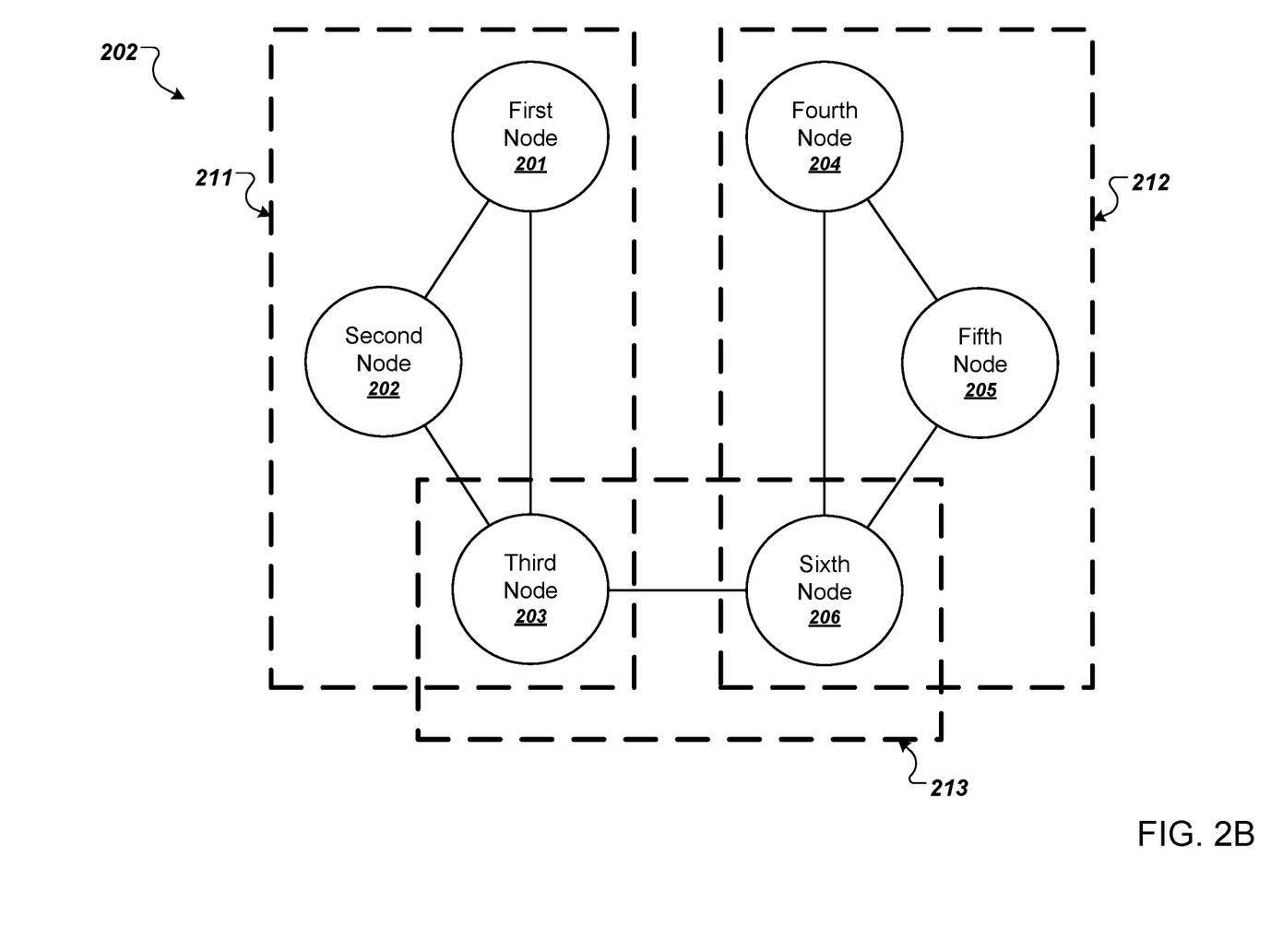
FIG. 2B illustrates example cliques of the complement of a collision exclusion graph.

FIG. 2B illustrates example cliques of the complement 202 of a collision exclusion graph.

In particular, FIG. 2B illustrates the complement 202 of the collision exclusion graph 200 described above with reference to FIG. 2A. Each of the nodes 201-206 shared an edge in the complement 202 if and only if they do not share an edge in the collision exclusion graph 200.

The complement 202 of the collision exclusion graph 200 includes three maximal cliques: a first clique 211 that includes the first node 201, second node 202, and third node 203; a second clique 212 that includes the fourth node 204, fifth node 205, and sixth node 206; and a third clique 213 that includes the third node 203 and sixth node 206.

Referring back to FIG. 3, a system (e.g., the planner 120 described with reference to FIG. 1) can generate the collision exclusion bitmasks 301-306 using identified cliques 211, 212, and 213 of the complement 202 of the collision exclusion graph 200. In particular, the first bit position of the collision exclusion bitmasks 301-306 corresponds to the first clique 211, where the bitmasks 301, 302, and 303 have a value of '1' at the first bit position because the corresponding nodes 201, 202, and 203 are members of the first clique 211. Similarly, the second bit position of the collision exclusion bitmasks 301-306 corresponds to the second clique 212, where the bitmasks 304, 305, and 306 have a value of '1' at the second bit position because the corresponding nodes 204, 205, and 206 are members of the second clique 212. Similarly, the third bit position of the collision exclusion bitmasks 301-306 corresponds to the second clique 213, where the bitmasks 303 and 306 have a value of '1' at the third bit position because the corresponding nodes 203 and 206 are members of the third clique 213.

Referring back to FIG. 1, after generating the collision exclusion bitmasks, the planner 120 can process the collision exclusion bitmasks to generate the robotic control plan 122. For example, the planner 120, e.g., the simulator of the planner 120 described above, can identify a particular collision exclusion bitmask corresponding to a particular robot 170a-n in the operating environment 170. The planner 120 can then compare (i) the particular collision exclusion bitmask and (ii) the other generated collision exclusion bitmasks (e.g., by computing the bitwise-AND as described above) to determine the objects in the operating environment 170 that cannot collide with the particular robot 170a-n (or that are approximated not to collide with the particular object, e.g., in a simulation of the operating environment 170, as described above).

The planner 120 can then generate a robotic control plan 122 that includes a planned motion for the particular robot 170a-n that disregards the position of the objects that have been determined to have a collision exclusion relationship with the particular robot 170a-n. As a particular example, the planner 120 can determine not to consider the position of the determined objects as an input when generating the planned motion for the particular robot 170a-n.

As another particular example, the simulator can be configured to evaluate a candidate robotic control plan and reject the candidate robotic control plan if it causes any unplanned collisions. In this example, the simulator can determine to ignore simulated collisions between the particular robot 170a-n and the objects that have been determined to have a collision exclusion relationship with the robot 170a-n. That is, the simulator can determine not to reject the candidate robotic control plan even if the simulation performed by the simulator indicates that the candidate robotic control plan causes the particular robot 170a-n to collide with one or more of the determined objects.

The robotic control plan 122 can include any appropriate data defining the execution of the one or more tasks by the robots 170a-n. For example, for each robot 170a-n, the robotic control plan can define (i) one or more software modules to be executed by the robot 170a-n during the execution of the robotic control plan 122, and/or (ii) one or more software module loops that each contains multiple software modules to be executed repeatedly in a predetermined sequence during the execution of the robotic control plan 122. Instead or in addition, the robotic control plan 122 can define a set of real-time messages that are to be exchanged between respective robots 170a-n or between respective software modules of the robots 170a-n during the execution of the robotic control plan 122.

After generating the robotic control plan 122, the planner 120 can provide the robotic control plan 122 to the robotic control system 150, which executes the robotic control plan 122. The robotic control system 150 can execute the one or more tasks defined by the robotic control plan 122 by issuing commands 155 to the operating environment 170 in order to drive the movements of the robots 170a-n.

In some implementations, instead of or in addition to executing the robotic control plan 122 in a real-world operating environment 170, the system 100 can provide the robotic control plan 122 to a simulation system for simulating the execution of the robotic control plan 122. The simulation system can use the collision exclusion bitmasks to determine whether execution of the robotic control plan would result in a collision or another unsafe operating condition. In doing so, the simulation system can ignore what otherwise would have been simulated collisions between objects having collision exclusion relationships as represented by the bitmasks. During or after performing a simulation of the plan, the simulation system can generate an indication representing whether or not there was a collision and any other appropriate characteristics of the collision, such as which objects were involved and how severe the collision was. The planner 120 can use this information to evaluate, or outright reject, a candidate robot plan.

For example, if due to inherent inaccuracies in modeling real-world robotic components, such as a complex gripper, the simulation results in the gripper colliding with an object to be grasped, the simulator can ignore the collision if the gripper and the object to be grasped have a collision exclusion relationship represented in the bitmasks. In real-life scenarios, the physical friction and force of the gripper fingers causes the object to be held, but many times these complex physical processes are difficult to perfectly recreate in simulation. For example, the simulated sensor data of the grippers may not match the force being generated to grip the box, and the mismatch can cause instability in the simulation. Adding a collision exclusion relationship between the gripper fingers and the grasped object can solve this problem when running the simulation. As another example, there are situations where the simulation system can guarantee that the robot will not collide with itself due to the kinematics model and motion plan being used. In those instances, it can be beneficial to bypass the simulation of different pieces of the robot colliding with themselves.

The simulation system can process the robotic control plan 122 and generate data representing the execution of the robotic control plan 122 in the simulation, e.g., to generate a prediction about the execution of the robotic control plan 122 in the operating environment 170. For example, the simulation system can be configured to generate a measure of success of the execution of the robotic control plan 122 in the simulation, e.g., a measure of the extent to which the one or more tasks were completed. As another example, the simulation system can be configured to generate a prediction of the safety of the execution of the robotic control plan 122, e.g., to predict whether the operating environment 170 would ever enter into an unsafe state if the robotic control plan 122 were to be executed in the operating environment 170. To name a few other examples, the simulation system can be configured to determine the time required to execute the robotic control plan 122, the computational resources required to execute the robotic control plan 122, the monetary cost required to execute the robotic control plan 122, or the throughput of the execution of the robotic control plan 122 (e.g., if the one or more tasks includes a task to fabricate or assemble an object).

In some implementations, instead of storing (or receiving) graph data 112 representing a graph whose edges between respective pairs of nodes indicate that the objects represented by the pair of nodes cannot collide, the system 100 can be configured to store (or receive) graph data 112 representing a graph whose edges between respective pairs of nodes indicate that the objects represented by the pair of nodes can collide. In other words, the system 100 can be configured to store the complement of the collision exclusion graph described above.

Similarly, in some implementations, instead of generating bitmasks that have a bitwise-AND equal to zero if the corresponding objects cannot collide, the system 100 can be configured to generate bitmasks that have a bitwise-AND equal to zero if the corresponding objects can collide. That is, two bitmasks having a '1' at the same position can indicate that the corresponding objects in the operating environment 170 have a collision exclusion relationship.

In these implementations, the system 100 can be configured to perform similar techniques to those described above to generate bitmasks from the graph.

Figure 4:
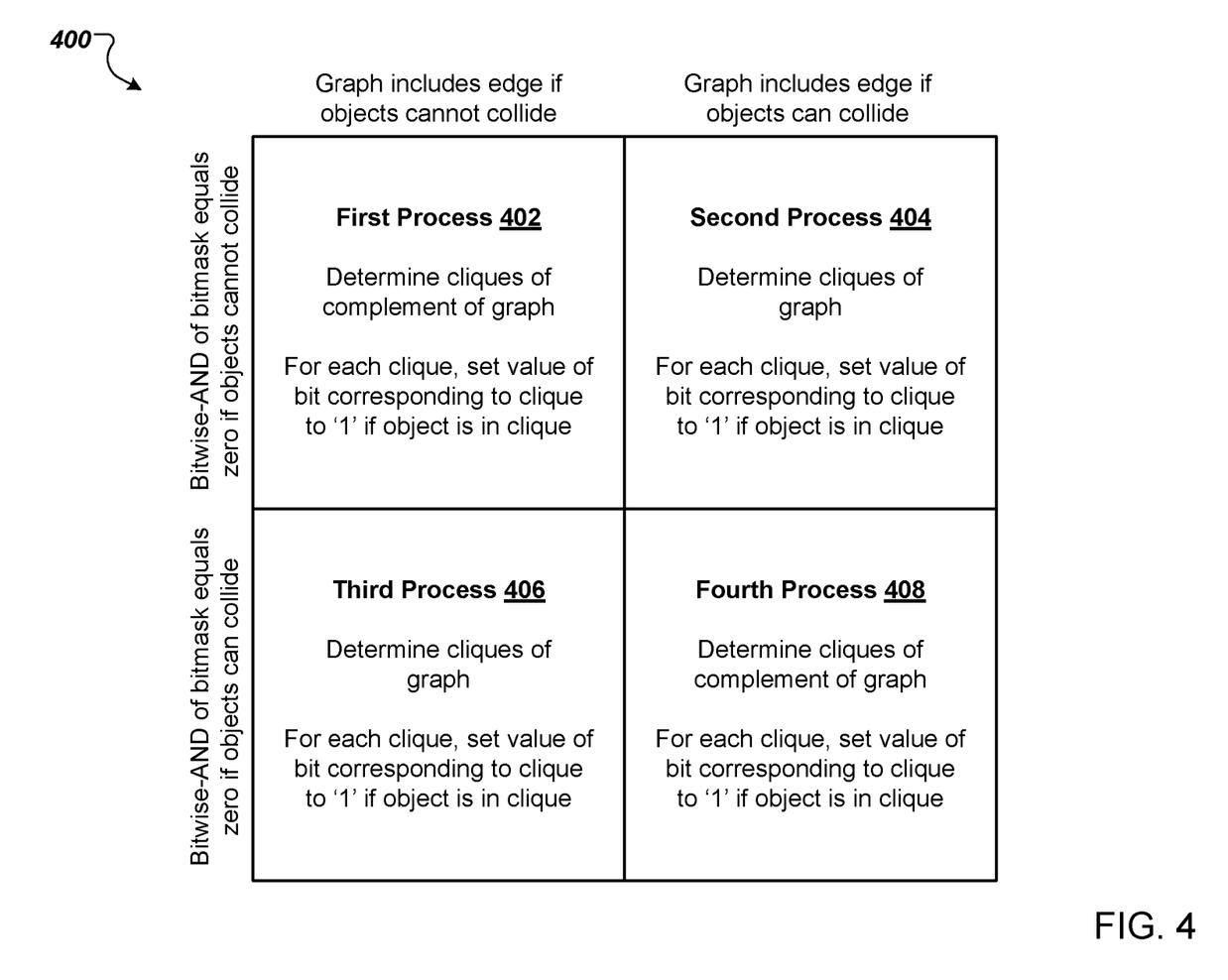
FIG. 4 illustrates a matrix that identifies different processes for converting representations of collision exclusion relationships.

FIG. 4 illustrates a matrix 400 that identifies different processes 402, 404, 406, and 408 for converting representations of collision exclusion relationships between objects in an operating environment.

In particular, the matrix 400 identifies processes for converting a graph representing the collision exclusion relationships to bitmasks representing the collision exclusion relationships in implementations in which (i) the graph includes edges between nodes if the objects in the operating environment represented by the nodes cannot collide or (ii) the graph includes edges between nodes if the objects in the operating environment represented by the nodes can collide. These two implementations are identified by respective columns of the matrix 400.

Similarly, the matrix 400 identifies processes for converting a graph representing the collision exclusion relationships to bitmasks representing the collision exclusion relationships in implementations in which (i) the bitwise-AND between a pair of bitmasks equals zero if the objects corresponding to the pair of bitmasks cannot collide and (ii) the bitwise-AND between a pair of bitmasks equals zero if the objects corresponding to the pair of bitmasks can collide. These two implementations are identified by respective rows of the matrix 400.

The processes 402, 404, 406, and 408 can be implemented by one or more computer programs installed on one or more computers and programmed in accordance with this specification. For example, the processes 402, 404, 406, and 408 can be performed by the planner 120 described with reference to FIG. 1. For convenience, the processes 402, 404, 406, and 408 will be described as being performed by a system of one or more computers.

The system can perform the first process 402 in implementations in which (i) the graph includes edges between nodes if the objects represented by the nodes cannot collide and (ii) the bitwise-AND between a pair of bitmasks equals zero if the objects corresponding to the pair of bitmasks cannot collide. That is, the first process 402 can be performed in the implementation described above with reference to FIG. 1.

In the first process 402, the system can determine cliques of the complement of the graph, as described above. For the bitmask corresponding to each object and for each determined clique of the complement of the graph, the system can then determine the value of the bit at the bit position corresponding to the determined clique to be '1' if the node representing the object is in the clique, and '0' otherwise.

The system can perform the second process 404 in implementations in which (i) the graph includes edges between nodes if the objects represented by the nodes can collide and (ii) the bitwise-AND between a pair of bitmasks equals zero if the objects corresponding to the pair of bitmasks cannot collide.

In the second process 404, the system can determine cliques of the graph itself. For the bitmask corresponding to each object and for each determined clique of the graph, the system can then determine the value of the bit at the bit position corresponding to the determined clique to be '1' if the node representing the object is in the clique, and '0' otherwise.

The system can perform the third process 406 in implementations in which (i) the graph includes edges between nodes if the objects represented by the nodes cannot collide and (ii) the bitwise-AND between a pair of bitmasks equals zero if the objects corresponding to the pair of bitmasks can collide.

In the third process 406, the system can determine cliques of the graph itself. For the bitmask corresponding to each object and for each determined clique of the graph, the system can then determine the value of the bit at the bit position corresponding to the determined clique to be '1' if the node representing the object is in the clique, and '0' otherwise.

The system can perform the fourth process 408 in implementations in which (i) the graph includes edges between nodes if the objects represented by the nodes can collide and (ii) the bitwise-AND between a pair of bitmasks equals zero if the objects corresponding to the pair of bitmasks can collide.

In the fourth process 408, the system can determine cliques of the complement of the graph. For the bitmask corresponding to each object and for each determined clique of the complement of the graph, the system can then determine the value of the bit at the bit position corresponding to the determined clique to be '1' if the node representing the object is in the clique, and '0' otherwise.

Although the above description generally refers to converting a collision exclusion graph to collision exclusion bitmasks, generally the system 100 can be configured to convert any appropriate first representation of the collision exclusion relationships between the objects in the operating environment 170 to any appropriate second representation of the collision exclusion relationships. For example, the system 100 can be configured to receive collision exclusion bitmasks and process the collision exclusion bitmasks to generate a collision exclusion graph.

As a particular example, in implementations in which (i) the bitwise-AND between a pair of provided bitmasks equals zero if the objects corresponding to the pair of bitmasks cannot collide and (ii) the graph to be generated is to include edges between nodes if the objects represented by the nodes cannot collide (that is, in the implementations described above with reference to FIG. 1), the system can compute the bitwise-AND between each pair of bitmasks. If the bitwise-AND is equal to zero, then the system can determine to add an edge between the corresponding pair of nodes in the generated graph; otherwise, the system can determine not to add an edge between the corresponding pair of nodes.

Alternatively, for each clique of the complement of the graph to be generated (represented by a respective bit position in the provided bitmasks), the system can determine a set of nodes for which the corresponding bitmasks have a value of '1' at the bit position (indicating that the node should be included in the clique). The system can then generate the complement of the graph by generating edges between all of the nodes in the set corresponding to each clique. The system can then generate the graph itself from the complement of the graph, i.e., by determining the complement of the complement of the graph.

As another particular example, in implementations in which (i) the bitwise-AND between a pair of provided bitmasks equals zero if the objects corresponding to the pair of bitmasks can collide and (ii) the graph to be generated is to include edges between nodes if the objects represented by the nodes cannot collide, the system can compute the bitwise-AND between each pair of bitmasks. If the bitwise-AND is equal to zero, then the system can determine not to add an edge between the corresponding pair of nodes in the generated graph; otherwise, the system can determine to add an edge between the corresponding pair of nodes.

Alternatively or in addition, for each clique of the graph to be generated (represented by a respective bit position in the provided bitmasks), the system can determine a set of nodes for which the corresponding bitmasks have a value of '1' at the bit position (indicating that the node should be included in the clique). The system can then generate the graph by generating edges between all of the nodes in the set corresponding to each clique.

As another particular example, in implementations in which (i) the bitwise-AND between a pair of provided bitmasks equals zero if the objects corresponding to the pair of bitmasks cannot collide and (ii) the graph to be generated is to include edges between nodes if the objects represented by the nodes can collide, the system can compute the bitwise-AND between each pair of bitmasks. If the bitwise-AND is equal to zero, then the system can determine not to add an edge between the corresponding pair of nodes in the generated graph; otherwise, the system can determine to add an edge between the corresponding pair of nodes.

Alternatively or in addition, for each clique of the graph to be generated (represented by a respective bit position in the provided bitmasks), the system can determine a set of nodes for which the corresponding bitmasks have a value of I' at the bit position (indicating that the node should be included in the clique). The system can then generate the graph by generating edges between all of the nodes in the set corresponding to each clique.

As another particular example, in implementations in which (i) the bitwise-AND between a pair of provided bitmasks equals zero if the objects corresponding to the pair of bitmasks can collide and (ii) the graph to be generated is to include edges between nodes if the objects represented by the nodes can collide, the system can compute the bitwise-AND between each pair of bitmasks. If the bitwise-AND is equal to zero, then the system can determine to add an edge between the corresponding pair of nodes in the generated graph; otherwise, the system can determine not to add an edge between the corresponding pair of nodes.

Alternatively or in addition, for each clique of the complement of the graph to be generated (represented by a respective bit position in the provided bitmasks), the system can determine a set of nodes for which the corresponding bitmasks have a value of '1' at the bit position (indicating that the node should be included in the clique). The system can then generate the complement of the graph by generating edges between all of the nodes in the set corresponding to each clique. The system can then generate the graph itself from the complement of the graph, i.e., by determining the complement of the complement of the graph.

Alternatively or in addition, the system can be configured to process other representations of collision exclusion relationships. For example, the system can store both a collision bitmask and a category bitmask. In this arrangement with two separate bitmasks, to see if one object collides with another, the category of one object is first used to mask the collision bitmask of the other. This can be expressed using the following formula:

(category_A & collision_B) (category_B & collision_A)

The objects will be marked as "collidable" if the above value is nonzero. When using this representation, a similar algorithm as described above can be used to determine the category bitmasks alongside the collision bitmasks.

Figure 5:
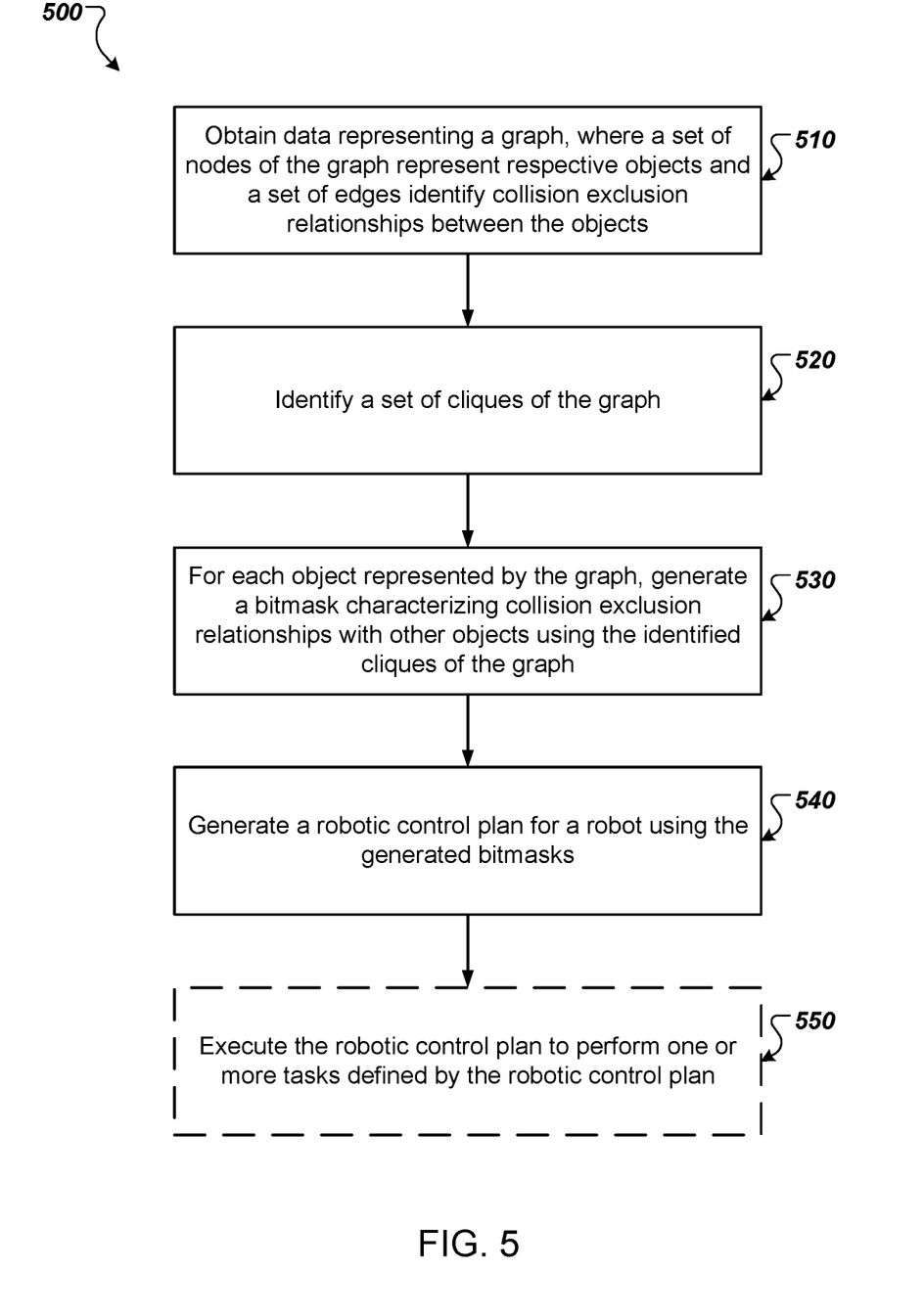
FIG. 5 is a flowchart of an example process for generating collision exclusion bitmasks using a collision exclusion graph.

FIG. 5 is a flowchart of an example process 500 for generating collision exclusion bitmasks using a collision exclusion graph. The process 500 can be implemented by one or more computer programs installed on one or more computers and programmed in accordance with this specification. For example, the process 500 can be performed by the planner 120 described with reference to FIG. 1. For convenience, the process 500 will be described as being performed by a system of one or more computers.

The system obtains data representing a graph, where (i) a set of nodes of the graph represent respective objects in a robotic operating environment and (ii) a set of edges between respective pairs of nodes of the graph identify collision exclusion relationships between the objects in the robotic operating environment (step 510).

For example, for each edge between a respective pair of nodes, the edge can identify that there is a collision exclusion relationship between the objects in the robotic operating environment represented by the pair of nodes. As another example, for each edge between a respective pair of nodes, the edge can identify that there is not a collision exclusion relationship between the objects in the robotic operating environment represented by the pair of nodes.

In some implementations, the system obtains the data representing the graph by obtaining initial data representing an initial graph, where the graph is the complement of the initial graph. The system can thus generate the data representing the graph by determining the complement of the initial graph.

The system identifies a set of cliques of the graph (step 520).

The system generates, using the identified cliques of the graph and for each particular object represented by a respective node of the graph, a bitmask characterizing collision exclusion relationships between the particular object and other objects in the robotic operating environment (step 530). The system can generate the bitmasks such that, after generating the bitmasks, a comparison between (i) a first bitmask corresponding to a first object and (ii) a second bitmask corresponding to a second object indicates whether the first object and the second object have a collision exclusion relationship.

For example, the system can generate the bitmasks such that, after generating the bitmasks, if the bitwise-AND between (i) a first bitmask corresponding to a first object and (ii) a second bitmask corresponding to a second object is equal to zero, then the first object and the second object have a collision exclusion relationship. As another example, the system can generate the bitmasks such that, after generating the bitmasks, if the bitwise-AND between (i) a first bitmask corresponding to a first object and (ii) a second bitmask corresponding to a second object is equal to zero, then the first object and the second object do not have a collision exclusion relationship.

Each bitmask can include the same number of bits (i.e., respective bits in the same number of bit positions), where each bit of the bitmasks corresponds to a respective clique of the graph (e.g., where each bit position corresponding to a respective clique).

For example, to generate the bitmask characterizing collision exclusion relationships between a particular object and other objects in the robotic operating environment, the system can, for each identified clique of the graph, determine whether the node representing the particular object is a member of the clique. In response to determining that the node representing the particular object is a member of the clique, the system can determine the value of the bit corresponding to the identified clique to be I' in the bitmask. In response to determining that the node representing the particular object is not a member of the clique, the system can determine the value of the bit corresponding to the identified clique to be '0' in the bitmask.

The system simulates execution of a robotic control plan for a robot in the robotic operating environment using the generated bitmasks (step 540).

For example, the system can identify a particular bitmask corresponding to the robot. Using the particular bitmask and the other bitmasks, the system can identify one or more particular objects in the robotic operating environment that have collision exclusion relationships with the robot. The system can then simulate execution of a planned motion for the robot that disregards a respective position of each particular object in the robotic operating environment for which the robot has a collision exclusion relationship.

Instead or in addition, the system can cause the generated bitmasks to be consumed by a simulator that is configured to simulate motion of objects in the robotic operating environment Optionally, the system executes the robotic control plan on a physical robot to perform one or more tasks defined by the robotic control plan (step 550). Instead or in addition, the system can only perform a simulation of the execution of the robotic control plan.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining data representing an collision exclusion graph, wherein:
    a plurality of nodes of the collision exclusion graph represent respective objects in a robotic operating environment, and
    a plurality of edges between respective pairs of nodes of the collision exclusion graph identify collision exclusion relationships between the objects in the robotic operating environment;
  identifying a plurality of cliques of the collision exclusion graph;
  generating, using the identified cliques of the collision exclusion graph and for each particular object represented by a respective node of the collision exclusion graph, a bitmask representing collision exclusion relationships between the particular object and other objects in the robotic operating environment; and simulating execution of a robotic control plan for a robot in the robotic operating environment using the generated bitmasks to detect collisions.

Embodiment 2 is the method of embodiment 1, wherein, after generating the bitmasks, a comparison between (i) a first bitmask corresponding to a first object and (ii) a second bitmask corresponding to a second object indicates whether the first object and the second object have a collision exclusion relationship represented in the initial collision exclusion graph.

Embodiment 3 is the method of any one of embodiments 1-2, wherein simulating execution of the robotic control plan using the generated bitmasks comprises using the bitmasks to ignore collisions between objects having collision exclusion relationships represented in the bitmasks.

Embodiment 4 is the method of any one of embodiments 1-3, wherein:

after generating the bitmasks, if the bitwise-AND between (i) a first bitmask corresponding to a first object and (ii) a second bitmask corresponding to a second object is equal to zero, then the first object and the second object have a collision exclusion relationship, or after generating the bitmasks, if the bitwise-AND between (i) a first bitmask corresponding to a first object and (ii) a second bitmask corresponding to a second object is equal to zero, then the first object and the second object do not have a collision exclusion relationship.

Embodiment 5 is the method of any one of embodiments 1-4, wherein obtaining the data representing the collision exclusion graph comprises:

obtaining initial data representing an initial graph; and
generating the data representing the collision exclusion graph by determining a complement of the initial graph.

Embodiment 6 is the method of any one of embodiments 1-5, wherein each bitmask comprises a same number of bits, and wherein each bit of the bitmasks corresponds to a different respective clique of the graph.

Embodiment 7 is the method of embodiment 6, wherein generating a bitmask representing collision exclusion relationships between a particular object and other objects in the robotic operating environment comprises:

for each identified clique of the graph:
determining whether the node representing the particular object is a member of the clique;
in response to determining that the node representing the particular object is a member of the clique:
determining a value of a bit corresponding to the identified clique to be '1' in the bitmask; and
in response to determining that the node representing the particular object is not a member of the clique:
determining the value of the bit corresponding to the identified clique to be '0' in the bitmask.

Embodiment 8 is the method of any one of embodiments 1-7, wherein simulating execution of the robotic control plan for the robot in the robotic operating environment comprises:

identifying a particular bitmask corresponding to the robot;

using the particular bitmask and the other bitmasks to identify one or more particular objects in the robotic operating environment that have collision exclusion relationships with the robot; and executing a planned motion for the robot that disregards collisions between the robot and each particular object in the robotic operating environment with which the robot has a collision exclusion relationship.

Embodiment 9 is the method of any one of embodiments 1-8, wherein the generated bitmasks are consumed by a simulator that is configured to simulate motion of objects in the robotic operating environment.

Embodiment 10 is the method of any one of embodiments 1-9, further comprising executing the robotic control plan on a physical robot to perform one or more tasks defined by the robotic control plan.

Embodiment 10 is a system comprising: one or more computers and one or more storage devices storing instructions that are operable, when executed by the one or more computers, to cause the one or more computers to perform the method of any one of embodiments 1 to 10.

Embodiment 11 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

The invention claimed is:

1. A method comprising:
obtaining data representing a collision exclusion graph, wherein:
a plurality of nodes of the collision exclusion graph represent respective objects in a robotic operating environment, and
a plurality of edges between respective pairs of nodes of the collision exclusion graph identify collision exclusion relationships between the objects in the robotic operating environment;
identifying a plurality of cliques of the collision exclusion graph;
generating, using the identified cliques of the collision exclusion graph and for each particular object represented by a respective node of the collision exclusion graph, a bitmask representing collision exclusion relationships between the particular object and other objects in the robotic operating environment; and
simulating execution of a robotic control plan for a robot in the robotic operating environment using the generated bitmasks to detect collisions by ignoring collisions between objects having exclusion relationships represented in the bitmasks.

2. The method of claim 1, wherein, after generating the bitmasks, a comparison between (i) a first bitmask corresponding to a first object and (ii) a second bitmask corresponding to a second object indicates whether the first object and the second object have a collision exclusion relationship represented in the initial collision exclusion graph.

3. The method of claim 1, wherein:
after generating the bitmasks, if a logic comparison conducted by bitwise-AND between (i) a first bitmask corresponding to a first object and (ii) a second bitmask corresponding to a second object is equal to zero, then the first object and the second object have a collision exclusion relationship, or
after generating the bitmasks, if the logic comparison conducted by the bitwise-AND between (i) a first bitmask corresponding to a first object and (ii) a second bitmask corresponding to a second object is equal to zero, then the first object and the second object do not have a collision exclusion relationship.

4. The method of claim 1, wherein obtaining the data representing the collision exclusion graph comprises:
obtaining initial data representing an initial graph; and
generating the data representing the collision exclusion graph by determining a complement of the initial graph.

5. The method of claim 1, wherein each bitmask comprises a same number of bits, and wherein each bit of the bitmasks corresponds to a different respective clique of the collision exclusion graph.

6. The method of claim 5, wherein generating a bitmask representing collision exclusion relationships between a particular object and other objects in the robotic operating environment comprises:
for each identified clique of the graph:
determining whether the node representing the particular object is a member of the clique;
in response to determining that the node representing the particular object is a member of the clique:
determining a value of a bit corresponding to the identified clique to be '1' in the bitmask; and
in response to determining that the node representing the particular object is not a member of the clique:
determining the value of the bit corresponding to the identified clique to be '0' in the bitmask.

7. The method of claim 1, wherein simulating execution of the robotic control plan for the robot in the robotic operating environment comprises:
identifying a particular bitmask corresponding to the robot;
using the particular bitmask and the other bitmasks to identify one or more particular objects in the robotic operating environment that have collision exclusion relationships with the robot; and
executing a planned motion for the robot that disregards collisions between the robot and each particular object in the robotic operating environment with which the robot has a collision exclusion relationship.

8. The method of claim 1, wherein the generated bitmasks are consumed by a simulator that is configured to simulate motion of objects in the robotic operating environment.

9. The method of claim 1, further comprising executing the robotic control plan on a physical robot to perform one or more tasks defined by the robotic control plan.

10. A system comprising one or more computers and one or more storage devices storing instructions that are operable, when executed by the one or more computers, to cause the one or more computers to perform operations comprising:
obtaining data representing a collision exclusion graph, wherein:
a plurality of nodes of the collision exclusion graph represent respective objects in a robotic operating environment, and
a plurality of edges between respective pairs of nodes of the collision exclusion graph identify collision exclusion relationships between the objects in the robotic operating environment;
identifying a plurality of cliques of the collision exclusion graph;
generating, using the identified cliques of the collision exclusion graph and for each particular object represented by a respective node of the collision exclusion graph, a bitmask representing collision exclusion relationships between the particular object and other objects in the robotic operating environment; and
simulating execution of a robotic control plan for a robot in the robotic operating environment using the generated bitmasks to detect collisions by ignoring collisions between objects having exclusion relationships represented in the bitmasks.

11. The system of claim 10, wherein, after generating the bitmasks, a comparison between (i) a first bitmask corresponding to a first object and (ii) a second bitmask corresponding to a second object indicates whether the first object and the second object have a collision exclusion relationship represented in the initial collision exclusion graph.

12. The system of claim 10, wherein:
after generating the bitmasks, if a logic comparison conducted by bitwise-AND between (i) a first bitmask corresponding to a first object and (ii) a second bitmask corresponding to a second object is equal to zero, then the first object and the second object have a collision exclusion relationship, or
after generating the bitmasks, if the logic comparison conducted by the bitwise-AND between (i) a first bitmask corresponding to a first object and (ii) a second bitmask corresponding to a second object is equal to zero, then the first object and the second object do not have a collision exclusion relationship.

13. The system of claim 10, wherein obtaining the data representing the collision exclusion graph comprises:
  obtaining initial data representing an initial graph; and
  generating the data representing the collision exclusion graph by determining a complement of the initial graph.

14. The system of claim 10, wherein each bitmask comprises a same number of bits, and wherein each bit of the bitmasks corresponds to a different respective clique of the collision exclusion graph.

15. The system of claim 14, wherein generating a bitmask representing collision exclusion relationships between a particular object and other objects in the robotic operating environment comprises:
  for each identified clique of the graph:
    determining whether the node representing the particular object is a member of the clique;
    in response to determining that the node representing the particular object is a member of the clique:
      determining a value of a bit corresponding to the identified clique to be '1' in the bitmask; and
    in response to determining that the node representing the particular object is not a member of the clique:
      determining the value of the bit corresponding to the identified clique to be '0' in the bitmask.

16. The system of claim 10, wherein simulating execution of the robotic control plan for the robot in the robotic operating environment comprises:
  identifying a particular bitmask corresponding to the robot;
  using the particular bitmask and the other bitmasks to identify one or more particular objects in the robotic operating environment that have collision exclusion relationships with the robot; and
  executing a planned motion for the robot that disregards collisions between the robot and each particular object in the robotic operating environment with which the robot has a collision exclusion relationship.

17. The system of claim 10, wherein the generated bitmasks are consumed by a simulator that is configured to simulate motion of objects in the robotic operating environment.

18. One or more non-transitory computer storage media encoded with computer program instructions that when executed by a plurality of computers cause the plurality of computers to perform operations comprising:
  obtaining data representing a collision exclusion graph, wherein:
    a plurality of nodes of the collision exclusion graph represent respective objects in a robotic operating environment, and
    a plurality of edges between respective pairs of nodes of the collision exclusion graph identify collision exclusion relationships between the objects in the robotic operating environment;
  identifying a plurality of cliques of the collision exclusion graph;
  generating, using the identified cliques of the collision exclusion graph and for each particular object represented by a respective node of the collision exclusion graph, a bitmask representing collision exclusion relationships between the particular object and other objects in the robotic operating environment; and
  simulating execution of a robotic control plan for a robot in the robotic operating environment using the generated bitmasks to detect collisions by ignoring collisions between objects having exclusion relationships represented in the bitmasks.

* * * * *